United States Patent
Hou

(10) Patent No.: US 8,537,940 B2
(45) Date of Patent: Sep. 17, 2013

(54) WIRELESS COMMUNICATION SYSTEM AND METHOD OF PROCESSING A WIRELESS SIGNAL

(75) Inventor: Kun-Sui Hou, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 267 days.

(21) Appl. No.: 13/018,818

(22) Filed: Feb. 1, 2011

(65) Prior Publication Data

US 2011/0194588 A1 Aug. 11, 2011

(30) Foreign Application Priority Data

Feb. 9, 2010 (TW) ................................ 99103945 A

(51) Int. Cl.
*H03D 1/00* (2006.01)
*H04B 1/00* (2006.01)

(52) U.S. Cl.
USPC .......................................... 375/343; 375/142

(58) Field of Classification Search
USPC ................. 375/140, 142–143, 145, 316, 340, 375/343
See application file for complete search history.

(56) References Cited

U.S. PATENT DOCUMENTS

| | | | |
|---|---|---|---|
| 6,178,197 B1 * | 1/2001 | Froelich et al. | 375/150 |
| 6,275,185 B1 * | 8/2001 | Loomis | 342/357.46 |
| 6,369,753 B1 * | 4/2002 | Schucker et al. | 342/357.75 |

FOREIGN PATENT DOCUMENTS

| | | |
|---|---|---|
| CN | 101246210 | 8/2008 |
| EP | 1529223 A2 | 5/2005 |

OTHER PUBLICATIONS

English Abstract Translation of CN101246210 (Published Aug. 20, 2008).
English Abstract translation of EP1529223 (Published May 11, 2005).
English language translation (machine translation) of CN101246210 (published May 4, 2011).

* cited by examiner

*Primary Examiner* — Khanh C Tran
(74) *Attorney, Agent, or Firm* — McClure, Qualey & Rodack, LLP

(57) ABSTRACT

A wireless communication system includes: a frequency down-converting circuit for receiving a wireless signal and for performing frequency down-conversion on the wireless signal to output a frequency down-converted signal; a first training circuit for performing frequency comparison between the frequency down-converted signal and a plurality of candidate carrier signals having different frequencies so as to determine a plurality of selected carrier signals from the candidate carrier signals; a second training circuit for performing phase comparison between the frequency down-converted signal and phases of a pseudo-noise sequence at each of the selected carrier signals so as to determine a matching phase and a matching carrier; and a demodulator for demodulating the frequency down-converted signal according to the matching carrier and the matching phase so as to generate a demodulated signal.

14 Claims, 3 Drawing Sheets

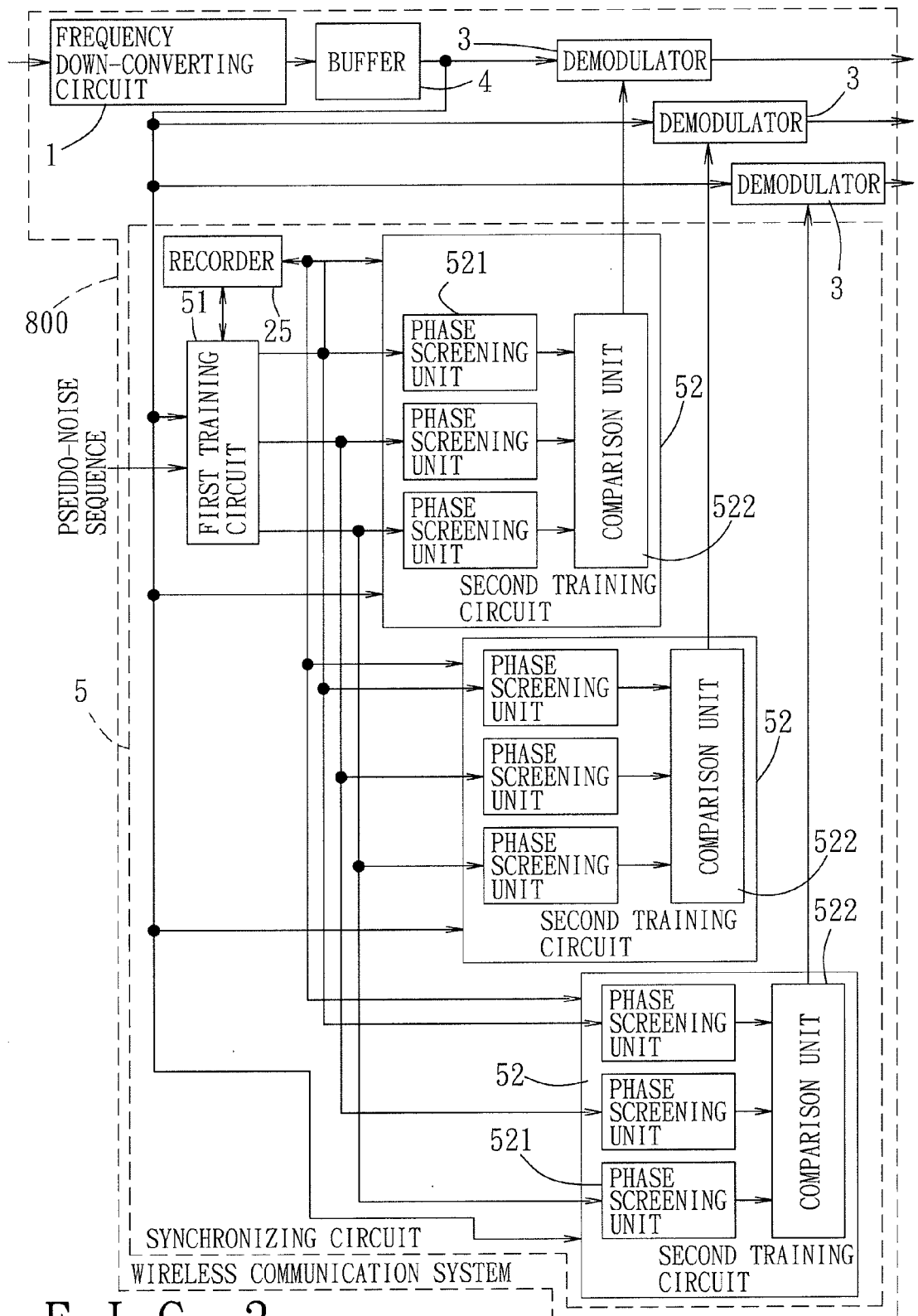
F I G. 3

WIRELESS COMMUNICATION SYSTEM AND METHOD OF PROCESSING A WIRELESS SIGNAL

CROSS-REFERENCE TO RELATED APPLICATION

This application claims priority of Taiwanese Application No. 099103945, filed on Feb. 9, 2010.

BACKGROUND OF THE INVENTION

1. Field of the Invention

The present invention relates to a wireless communication system, more particularly to a wireless communication system having a synchronizing unit.

2. Description of the Related Art

The global positioning system (GPS) utilizes direct sequence spread spectrum (DSSS) techniques for transmitting GPS signals, each of which contains information of a corresponding one of the GPS satellites. To obtain the information of a GPS satellite, a GPS receiver receives GPS signals transmitted by the GPS satellite, and includes a synchronizing unit for determining from the GPS signals a matching carrier signal and a matching phase of a corresponding pseudo-noise (PN) sequence signal so as to demodulate the GPS signals.

Assuming a conventional GPS receiver receives GPS signals of a number (V) of GPS satellites, and is operable to generate a number (F) of candidate carrier signals, the conventional GPS receiver is required to perform (V×F) cross-correlation computations just to determine the matching carrier signals, which can be time-consuming and inefficient. Furthermore, the conventional GPS receiver requires a large buffer unit for buffering the GPS signals, which can increase the hardware cost.

SUMMARY OF THE INVENTION

Therefore, an object of the present invention is to provide a wireless communication system that can reduce buffer usage and computational complexity.

According to one aspect, a wireless communication system of this invention includes a frequency down-converting circuit, a synchronizing circuit, and a demodulator.

The frequency down-converting circuit is for receiving a wireless signal and for performing frequency down-conversion on the wireless signal to output a frequency down-converted signal.

The synchronizing circuit is coupled to the frequency down-converting circuit, and includes first and second training circuits. The first training circuit is for performing frequency comparison between the frequency down-converted signal and a plurality of candidate carrier signals having different frequencies so as to determine a plurality of selected carrier signals from the candidate carrier signals. The second training circuit is for performing phase comparison between the frequency down-converted signal and phases of a pseudo-noise sequence at each of the selected carrier signals so as to determine a matching phase associated with one of the selected carrier signals and to set said one of the selected carrier signals associated with the matching phase as a matching carrier.

The demodulator is coupled to the frequency down-converting circuit and the synchronizing circuit, and demodulates the frequency down-converted signal according to the matching carrier and the matching phase so as to generate a demodulated signal.

According to another aspect, a wireless communication system of this invention includes a frequency down-converting circuit, a synchronizing circuit, and a demodulator.

The frequency down-converting circuit is for receiving a wireless signal and for performing frequency down-conversion on the wireless signal to output a frequency down-converted signal. The synchronizing circuit is coupled to the frequency down-converting circuit, and performs comparison with the frequency down-converted signal to determine a matching carrier and a matching phase. The demodulator is coupled to the frequency down-converting circuit and the synchronizing circuit, and demodulates the frequency down-converted signal according to the matching carrier and the matching phase so as to generate a demodulated signal.

The synchronizing circuit performs frequency comparison between the frequency down-converted signal and a plurality of candidate carrier signals having different frequencies, and performs phase comparison between the frequency down-converted signal and phases of a pseudo-noise sequence at least one of frequency-compared ones of the candidate carrier signals so as to determine the matching phase associated with one of the frequency-compared ones of the candidate carrier signals. The matching carrier is said one of the frequency-compared ones of the candidate carrier signals associated with the matching phase.

Another object of the present invention is to provide a method of processing a wireless signal that can reduce buffer usage and computational complexity.

According to a farther aspect of this invention, a method of processing a wireless signal is to be implemented using a wireless communication system and includes:

receiving a wireless signal and performing frequency down-conversion on the wireless signal to output a frequency down-converted signal;

performing frequency comparison between the frequency down-converted signal and a plurality of candidate carrier signals having different frequencies so as to determine a plurality of selected carrier signals from the candidate carrier signals;

performing phase comparison between the frequency down-converted signal and phases of a pseudo-noise sequence at each of the selected carrier signals so as to determine a matching phase associated with one of the selected carrier signals and to set said one of the selected carrier signals associated with the matching phase as a matching carrier; and demodulating the frequency down-converted signal according to the matching carrier and the matching phase so as to generate a demodulated signal.

Yet another object of the present invention is to provide a synchronizing circuit adapted for providing a matching carrier and a matching phase for demodulation of a to-be-demodulated signal. The synchronizing circuit includes first and second training circuits.

The first training circuit is for performing frequency comparison between the to-be-demodulated signal and a plurality of candidate carrier signals having different frequencies so as to determine a plurality of selected carrier signals from the candidate carrier signals.

The second training circuit is for performing phase comparison between the to-be-demodulated signal and phases of a pseudo-noise sequence at each of the selected carrier signals so as to determine the matching phase associated with one of the selected carrier signals and to set said one of the selected carrier signals associated with the matching phase as the matching carrier.

BRIEF DESCRIPTION OF THE DRAWINGS

Other features and advantages of the present invention will become apparent in the following detailed description of the preferred embodiments with reference to the accompanying drawings, of which:

FIG. 3 is a block diagram of the second preferred embodiment of a wireless communication system according to the present invention.

DETAILED DESCRIPTION OF THE PREFERRED EMBODIMENTS

Figure 1:
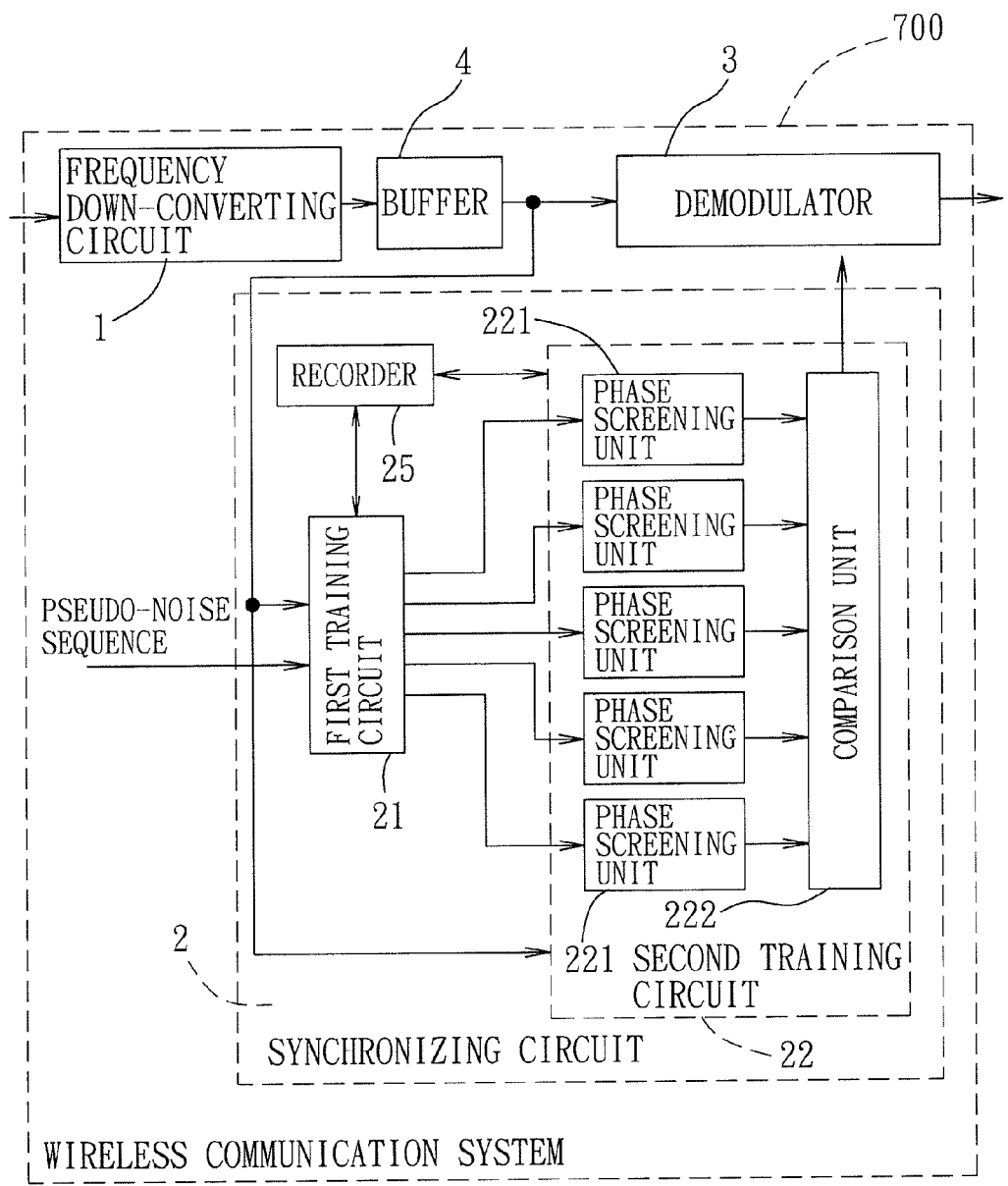
FIG. 1 is a block diagram of the first preferred embodiment of a wireless communication system according to the present invention.

Before the present invention is described in greater detail, it should be noted that like elements are denoted by the same reference numerals throughout the disclosure.

Referring to FIG. 1, the first preferred embodiment of a wireless communication system 700 according to the present invention is exemplified as a global positioning satellite (GPS) receiver system that includes a frequency down-converting circuit 1, a synchronizing circuit 2, a demodulator 3, and a buffer 4.

The frequency down-converting circuit 1 is operable to perform down-conversion on a wireless signal (e.g., a GPS signal) received by the wireless communication system 700 to output a frequency down-converted signal (i.e., a to-be-demodulated signal) for baseband operation. The buffer 4 is coupled to the frequency down-converting circuit 1 for buffering the frequency down-converted signal.

It is to be noted that the frequency down-converted signal corresponds to a pseudo-noise (PN) modulated signal generated by a GPS satellite, and that the same PN sequence is used by the wireless communication system 700 for demodulation of the frequency down-converted signal.

The synchronizing circuit 2 includes first and second training circuits 21, 22, and a recorder 25. The first training circuit 21 is a frequency training circuit operable to perform correlation computations to determine frequency correlations corresponding respectively to a number (F) of candidate carrier signals having different frequencies with reference to the PN sequence, and to select from the (F) candidate carrier signals a number (N) of selected carrier signals having relatively high frequency correlations with the frequency down-converted signal. In other words, the first training circuit 21 performs frequency comparison (i.e., correlation computations) between the frequency down-converted signal and the (F) candidate carrier signals so as to determine the (N) selected carrier signals from the candidate carrier signals. The number (N) is 5 in the embodiment of FIG. 1.

The second training circuit 22 is a phase training circuit including a number (N) of phase screening units 221 and a comparison unit 222. Each of the (N) phase screening units 221 receives a respective one of the (N) selected carrier signals, performs phase adjustment of the PN sequence, calculates phase correlations between phase of the frequency down-converted signal and the phases of the PN sequence at the respective one of the (N) selected carrier signals, and determines the phase of the PN sequence at the respective one of the (N) selected carrier signals having a largest phase correlation.

Figure 2:
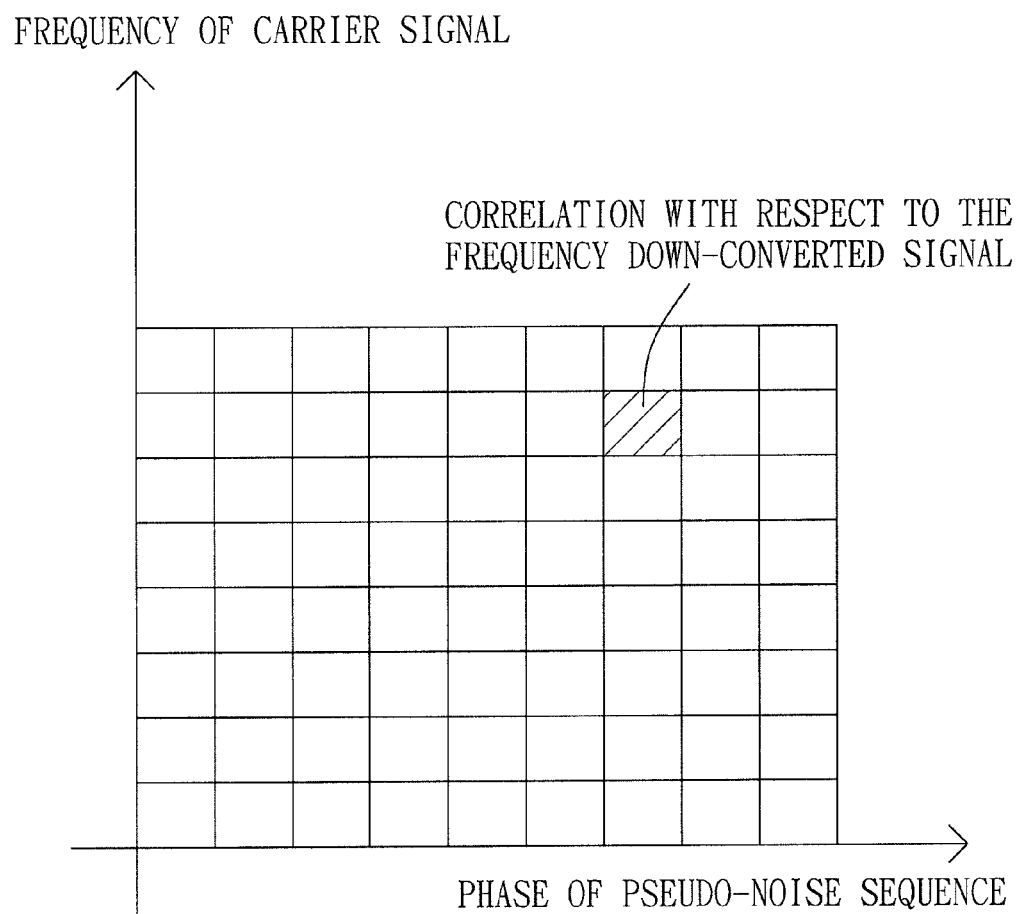
FIG. 2 is a diagram illustrating entries of correlation values recorded in a recorder of a synchronizing circuit of the wireless communication system.

Referring to FIG. 2, the recorder 25 is for recording correlations between phase of the frequency down-converted signal and the phases of the PN sequence at each of the (N) selected carrier signals in tabular form.

The comparison unit 222 is operable to select, from among the phases determined by the phase screening units 221 and with reference to the correlations recorded by the recorder 25, the phase having a correlation with the frequency down-converted signal that satisfies a predetermined criterion. In the present embodiment, the selected phase has a highest correlation with the frequency down-converted signal. However, in other embodiments, selection of the phase may vary according to different selection criteria, e.g., the selected phase has a correlation that exceeds a predetermined threshold.

Finally, the comparison unit 222 is operable to output the PN sequence at the selected phase as a matching sequence, and one of the (N) selected carrier signals that is associated with the selected phase as a matching carrier signal, for demodulation of the frequency down-converted signal by the demodulator 3 of the wireless communication system 700. The demodulator 3 is a known demodulator for processing a DSSS signal in this embodiment.

Therefore, the second training circuit 22 performs phase comparison (i.e., using a correlation function to calculate correlations) between the frequency down-converted signal and phases of the pseudo-noise sequence at each of the selected carrier signal so as to determine a matching phase and a matching carrier for subsequent use by the demodulator 3 in generating the demodulated signal.

The configuration of the wireless communication system 700 described above is for application where the number (N) is an integer greater than one and less than (F). If the number (N) is equal to one and less than the number (F), the first training circuit 21 will determine from the (F) candidate carrier signals only one selected carrier signal, and the second training circuit 22 will need only one phase screening unit 221. The comparison unit 222 can be omitted because the sole phase screening unit 221 will perform phase adjustment of the PN sequence, and output the phase-adjusted PN sequence with the highest correlation as the matching sequence and the sole selected carrier signal as the matching carrier.

In GPS applications, since content of the wireless signal may be repeatedly transmitted, neglect of parts of data is permitted. The second training circuit 22 can be configured to wait a period of time after the first training circuit 21 has performed frequency comparison before reading data from the buffer 4 such that the buffer 4 only needs to store data received when the second training circuit 22 performs phase comparison. This results in a reduced buffer space requirement compared to the prior art.

The buffer 4 is also not required to store a relatively large amount of data in application where the second training circuit 22 is not required to do phase comparison immediately, such as when the wireless signal is a television signal.

For simultaneous processing of GPS signals from an additional GPS satellite, an additional demodulator and an additional second training circuit (i.e., a third training circuit) are needed.

Referring to FIG. 3, the second preferred embodiment of a wireless communication system 800 according to the present invention is capable of processing GPS signals from up to three GPS satellites simultaneously because the wireless communication system 800 includes three demodulators 3, and the synchronizing unit 5 includes three second training circuits 52.

It is to be noted that the first training circuit 51 of the second preferred embodiment is operable to perform frequency correlation computations with reference to a compound PN sequence, which is a summation of mutually orthogonal PN sequences corresponding respectively to the GPS satellites, and that each of the second training circuits 52 performs phase correlation computations with reference to a respective one of the PN sequences. Thus, assuming that there are a number (F) of candidate carrier signals, the first training circuit 51 only needs to perform frequency correlation computation (F) times in order to determine three selected carrier signals from the (F) candidate carrier signals for phase correlation computation by each of the second training circuits 52, i.e., each second training circuit 52 performs phase comparison between the frequency down-converted signal and phases of the corresponding PN sequence at each of the three selected carrier signals so as to determine a corresponding matching phase and a corresponding matching carrier for subsequent use by the corresponding demodulator 3 in generating the corresponding demodulated signal. Moreover, assuming that the phase of each PN sequence is adjusted p times, each phase screening unit 521 only needs to perform a number (p) of phase comparisons. The overall computational complexity is thus reduced compared to the prior art.

It should be noted that the synchronizing circuits 2, 5 may be a separate component of the wireless communication system in other embodiments of this invention.

In summary, the first training circuits 21, 51 of the first and second preferred embodiments perform frequency correlation computations to determine from a number (F) of candidate carrier signals a number (N) of selected carrier signals, which effectively reduces the amount and time of computations required by the second phase training circuits 22, 52 such that a buffer 4 with a relatively small capacity can be employed. Furthermore, the first training circuit 51 of the second preferred embodiment performs frequency correlation computations using a compound PN sequence instead of corresponding PN sequences, thereby permitting simultaneous processing of frequency down-converted signals corresponding to a plurality of GPS satellites without compromising the overall performance.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A wireless communication system comprising:
a frequency down-converting circuit for receiving a wireless signal and for performing frequency down-conversion on the wireless signal to output a frequency down-converted signal;
a synchronizing circuit, coupled to the frequency down-converting circuit, including
a first training circuit for performing frequency comparison between the frequency down-converted signal and a plurality of candidate carrier signals having different frequencies so as to determine a plurality of selected carrier signals from the candidate carrier signals, and
a second training circuit, for performing phase comparison between the frequency down-converted signal and phases of a first pseudo-noise sequence at each of the selected carrier signals so as to determine a first matching phase associated with one of the selected carrier signals, and setting at least one of the selected carrier signals corresponding to the first matching phase as a first matching carrier; and
a first demodulator, coupled to the frequency down-converting circuit and the synchronizing circuit, for demodulating the frequency down-converted signal according to the first matching carrier and the first matching phase so as to generate a demodulated signal.

2. The wireless communication system as claimed in claim 1, wherein the first training circuit performs correlation computations between the frequency down-converted signal and the candidate carrier signals so as to determine the selected carrier signals.

3. The wireless communication system as claimed in claim 2, wherein the first training circuit performs the correlation computations to determine frequency correlations corresponding respectively to the candidate carrier signals, and selects a number (N) of the candidate carrier signals having relatively high correlations as the selected carrier signals.

4. The wireless communication system as claimed in claim 1, wherein the first training circuit determines a number (N) of the selected carrier signals from a number (F) of the candidate carrier signals, the number (N) being an integer less than the number (F) and greater than 1, the second training circuit including
a number (N) of phase screening units, each receiving a respective one of the selected carrier signals, performing phase adjustment of the first pseudo-noise sequence, calculating phase correlations between phase of the frequency down-converted signal and the phases of the first pseudo-noise sequence at the respective one of the selected carrier signals, and determining the phase of the first pseudo-noise sequence at the respective one of the selected carrier signals having a largest phase correlation; and
a comparison unit for selecting, from among the phases determined by the phase screening units, the phase having a correlation with the frequency down-converted signal that satisfies a predetermined criterion to serve as the first matching phase.

5. The wireless communication system as claimed in claim 1, wherein:
the synchronizing unit further includes a third training circuit for performing phase comparison between the frequency down-converted signal and phases of a second pseudo-noise sequence at each of the selected carrier signals so as to determine a second matching phase associated with one of the selected carrier signals and to set said one of the selected carrier signals associated with the second matching phase as a second matching carrier;
the first and second pseudo-noise sequences being mutually orthogonal;
the wireless communication system further comprising a second demodulator coupled to the frequency down-converting circuit and the synchronizing circuit, the second demodulator demodulating the frequency down-converted signal according to the second matching carrier and the second matching phase so as to generate a second demodulated signal.

6. The wireless communication system as claimed in claim 5, wherein the first training circuit performs frequency comparison between the frequency down-converted signal and the candidate carrier signals according to a compound sequence that is a summation of the first and second pseudo-noise sequences.

7. The wireless communication system as claimed in claim 1, wherein the second training circuit uses a correlation function to calculate correlations between the frequency down-converted signal and the phases of the first pseudo-noise sequence.

8. The wireless communication system as claimed in claim 1, which is a global positioning satellite receiver system.

9. A wireless communication system comprising:
   a frequency down-converting circuit for receiving a wireless signal and for performing frequency down-conversion on the wireless signal to output a frequency down-converted signal;
   a synchronizing circuit coupled to the frequency down-converting circuit and performing comparison with the frequency down-converted signal to determine a matching carrier and a matching phase; and
   a demodulator coupled to the frequency down-converting circuit and the synchronizing circuit, the demodulator demodulating the frequency down-converted signal according to the matching carrier and the matching phase so as to generate a demodulated signal;
   wherein the synchronizing circuit performs frequency comparison between the frequency down-converted signal and a plurality of candidate carrier signals having different frequencies, and performs phase comparison between the frequency down-converted signal and phases of a pseudo-noise sequence of at least one of the frequency-compared ones of the candidate carrier signals so as to determine the matching phase associated with one of the frequency-compared ones of the candidate carrier signals, the matching carrier being said one of the frequency-compared ones of the candidate carrier signals associated with the matching phase that is demodulated responsive to the match.

10. A method of processing a wireless signal to be implemented using a wireless communication system, comprising:
    receiving a wireless signal and performing frequency down-conversion on the wireless signal to output a frequency down-converted signal;
    performing frequency comparison between the frequency down-converted signal and a plurality of candidate carrier signals having different frequencies so as to determine a plurality of selected carrier signals from the candidate carrier signals;
    performing phase comparison between the frequency down-converted signal and phases of a pseudo-noise sequence at each of the selected carrier signals so as to determine a matching phase associated with one of the selected carrier signals and to set said one of the selected carrier signals associated with the matching phase as a matching carrier; and
    demodulating the frequency down-converted signal according to the matching carrier and the matching phase so as to generate a demodulated signal.

11. A synchronizing circuit adapted for providing a matching carrier and a matching phase for demodulation of a to-be-demodulated signal, said synchronizing circuit comprising:
    a first training circuit for performing frequency comparison between the to-be-demodulated signal and a plurality of candidate carrier signals having different frequencies so as to determine a plurality of selected carrier signals from the candidate carrier signals; and
    a second training circuit for performing phase comparison between the to-be-demodulated signal and phases of a pseudo-noise sequence at each of the selected carrier signals so as to determine the matching phase associated with one of the selected carrier signals and to set said one of the selected carrier signals associated with the matching phase as the matching carrier.

12. The synchronizing circuit as claimed in claim 11, wherein the first training circuit performs correlation computations between the to-be-demodulated signal and the candidate carrier signals so as to determine the selected carrier signals.

13. The synchronizing circuit as claimed in claim 12, wherein the first training circuit performs the correlation computations to determine frequency correlations corresponding respectively to the candidate carrier signals, and selects a number (N) of the candidate carrier signals having relatively high correlations as the selected carrier signals.

14. The synchronizing circuit as claimed in claim 11, wherein the first training circuit determines a number (N) of the selected carrier signals from a number (F) of the candidate carrier signals, the number (N) being an integer less than the number (F) and greater than 1, the second training circuit including
    a number (N) of phase screening units, each receiving a respective one of the selected carrier signals, performing phase adjustment of the pseudo-noise sequence, calculating phase correlations between phase of the to-be-demodulated signal and the phases of the pseudo-noise sequence at the respective one of the selected carrier signals, and determining the phase of the pseudo-noise sequence at the respective one of the selected carrier signals having a largest phase correlation; and
    a comparison unit for selecting, from among the phases determined by the phase screening units, the phase having a correlation with the to-be-demodulated signal that satisfies a predetermined criterion to serve as the matching phase.

* * * * *